United States Patent
Fan et al.

(10) Patent No.: US 12,120,036 B2
(45) Date of Patent: Oct. 15, 2024

(54) MULTI-LINK DEVICE ADOPTING BLOCK ACKNOWLEDGMENT AND PACKET ALLOCATION METHOD THEREOF

(71) Applicant: Realtek Semiconductor Corp., HsinChu (TW)

(72) Inventors: Wei-Kang Fan, HsinChu (TW); Tung-Min Lin, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 304 days.

(21) Appl. No.: 17/903,059

(22) Filed: Sep. 6, 2022

(65) Prior Publication Data

US 2023/0318985 A1    Oct. 5, 2023

(30) Foreign Application Priority Data

Mar. 14, 2022   (TW) .................................. 111109150

(51) Int. Cl.
*H04L 47/62* (2022.01)
*H04L 47/34* (2022.01)
*H04L 47/6295* (2022.01)
*H04W 28/02* (2009.01)
*H04W 84/12* (2009.01)

(52) U.S. Cl.
CPC .......... *H04L 47/621* (2013.01); *H04L 47/34* (2013.01); *H04L 47/6295* (2013.01); *H04W 28/0278* (2013.01); *H04W 84/12* (2013.01)

(58) Field of Classification Search
CPC ... H04L 47/621; H04L 47/34; H04L 47/6295; H04W 28/0278; H04W 84/12
See application file for complete search history.

(56) References Cited

U.S. PATENT DOCUMENTS

| | | | |
|---|---|---|---|
| 8,121,035 B2 * | 2/2012 | Oh ......................... | H04L 49/90 370/428 |
| 11,800,402 B2 * | 10/2023 | Huang .................. | H04L 45/245 |
| 2018/0206190 A1 * | 7/2018 | Cherian ................ | H04L 1/1621 |
| 2021/0211235 A1 * | 7/2021 | Chu ....................... | H04L 1/1614 |
| 2022/0247691 A1 * | 8/2022 | Xu .......................... | H04L 47/34 |
| 2023/0011167 A1 * | 1/2023 | Chitrakar ............. | H04W 76/15 |
| 2023/0050803 A1 * | 2/2023 | Gan ...................... | H04W 76/19 |

* cited by examiner

*Primary Examiner* — Christopher M Crutchfield
*Assistant Examiner* — Tito Q Pham
(74) *Attorney, Agent, or Firm* — Winston Hsu

(57) ABSTRACT

A multi-link device includes a first link queue, a second link queue, a control circuit, a first transmitter and a second transmitter. The control circuit includes a common queue for buffering a plurality of packets, each packet having a sequence number. The control circuit obtains a minimum sequence number of all packets in the first link queue and the second link queue, computes a maximum sequence number according to the minimum sequence number and a block acknowledgment window size, determines whether to allocate a set of packets from the common queue according to the maximum sequence number, and if so, allocates the set of packets to the first link queue and/or the second link queue. The first transmitter transmits a packet from the first link queue to a first receiving device, and the second transmitter transmits a packet from the second link queue to a second receiving device.

16 Claims, 3 Drawing Sheets

MULTI-LINK DEVICE ADOPTING BLOCK ACKNOWLEDGMENT AND PACKET ALLOCATION METHOD THEREOF

BACKGROUND OF THE INVENTION

1. Field of the Invention

The present invention relates to wireless communication, and in particular, to a multi-link device adopting block acknowledgment and a packet allocation method thereof.

2. Description of the Prior Art

IEEE 802.11be standard specifies communication protocols of wireless access technologies for the new generation of Wi-Fi 7, supporting multi-link operations (MLO) and a block acknowledgment (BA) mechanism. MLO is used to aggregate multiple channels over different frequency bands, so as to ensure seamless data transmission regardless of signal interference or network congestion in certain frequency bands, enhancing the data rate and reliability of the network, and being significant in video streaming and gaming applications requiring stable, continuous and real-time transmission quality. The BA mechanism uses a BA frame to acknowledge reception of a set of packets having been successfully received. MLO and BA can be used to achieve a high data rate, high throughput, and low latency.

In the related art, during a data transmission, a multi-link device employs software to control the data flow of each link. However, each link is independent of each other and cannot exchange information with each other during the data transmission, the transmission of control information to the software will introduce significant transmission delay and require a lot of system resources, leading to difficulty with meeting the timing requirements of control information, and difficulty with performing an accurate data flow control for each link owing to the software being unable to obtain the required control information from a radio environment report in certain data systems such as a universal serial bus (USB) system. Further, even if the control information can be obtained, the radio environment might vary when the software uses the system resources to schedule transmission resources, set up the radio environment and perform a packet transmission, leading to inefficient resource allocation.

SUMMARY OF THE INVENTION

According to an embodiment of the invention, a multi-link device includes a first link queue, a second link queue, a control circuit, a first transmitter, and a second transmitter. The control circuit is coupled to the first link queue and the second link queue, and includes a common queue used to buffer a plurality of packets, each packet having a sequence number. The control circuit is used to obtain a minimum sequence number of all packets in the first link queue and all packets in the second link queue, compute a maximum sequence number according to the minimum sequence number and a block acknowledgment window size, determine whether to allocate a set of packets from the common queue according to the maximum sequence number, and if so, allocate the set of packets to the first link queue and/or the second link queue. The first transmitter is coupled to the first link queue, and is used to transmit a packet from the first link queue to a first receiving device. The second transmitter is coupled to the second link queue, and is used to transmit a packet from the second link queue to a second receiving device.

According to another embodiment of the invention, a packet allocation method for a multi-link device comprising a first link queue, a second link queue, a control circuit, a first transmitter and a second transmitter is provided. The control circuit is coupled to the first link queue and the second link queue, and the control circuit includes a common queue configured to buffer a plurality of packets, each packet having a sequence number. The first transmitter is coupled to the first link queue, and the second transmitter is coupled to the second link queue. The packet allocation method includes the control circuit obtaining a minimum sequence number of all packets in the first link queue and all packets in the second link queue, the control circuit computing a maximum sequence number according to the minimum sequence number and a block acknowledgement window size, the control circuit determining whether to allocate a set of packets from the common queue according to the maximum sequence number, if the control circuit determines to allocate the set of packets, the control circuit allocating the set of packets to the first link queue and/or the second link queue, the first transmitter transmitting a packet in the first link queue to a first receiving device, and the second transmitter transmitting a packet in the second link queue to a second receiving device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
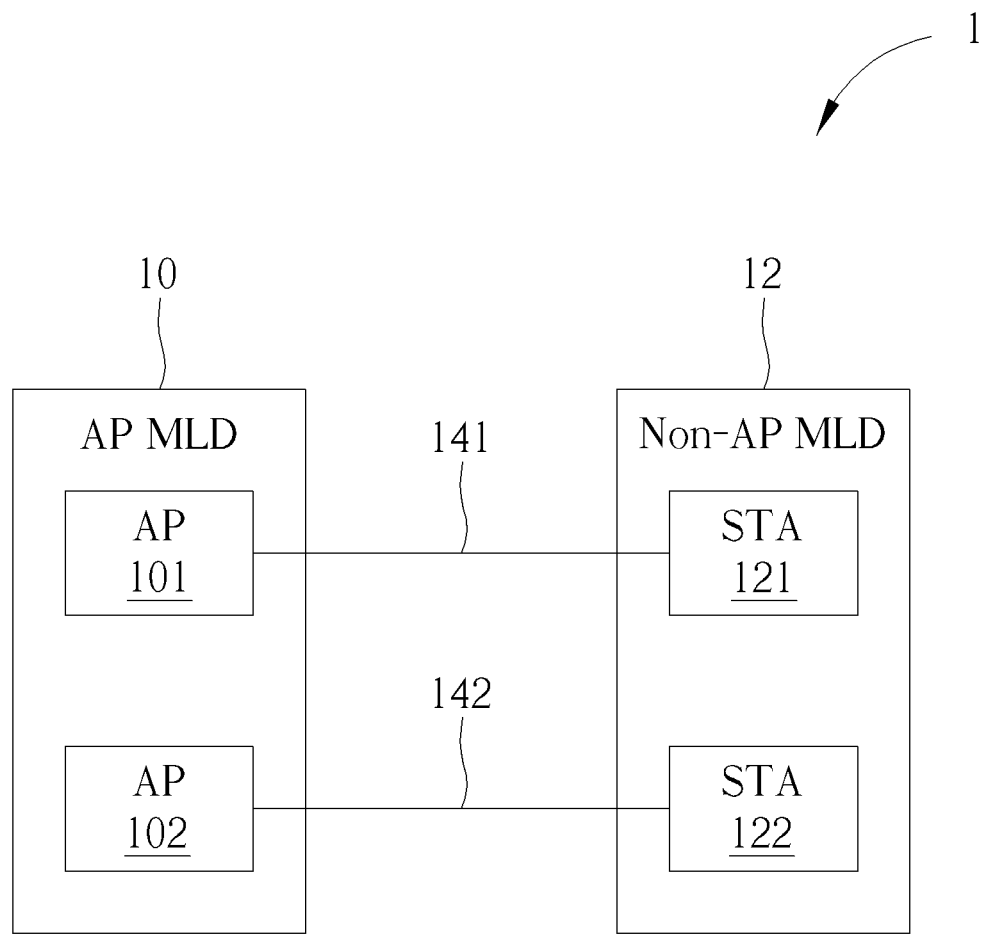
FIG. 1 is a schematic diagram of a multi-link communication system according to an embodiment of the present invention.

FIG. 1 is a schematic diagram of a multi-link communication system 1 according to an embodiment of the invention. The multi-link communication system 1 includes an access point multi-link device (AP MLD) 10 and a non-AP multi-link device (non-AP MLD) 12. The multi-link communication system 1 is compatible with IEEE 802.11 standard, for example, IEEE 802.11be standard.

The AP MLD 10 includes access points (AP) 101 and 102, and the non-AP MLD 12 includes stations (STA) 121 and 122. The APs 101 and 102, and the STAs 121 and 122 may be logical devices, and may be implemented by hardware, software, firmware, or a combination thereof. The AP MLD 10 and the non-AP MLD 12 may establish links 141 and 142 therebetween in the same or different frequency bands. For example, the link 141 may be operated in the 2.4 GHz frequency band, the link 142 may be operated in the 5 GHz frequency band, and the AP 101 and the AP 102 may simultaneously communicate with the STA 121 and the STA 122 via the links 141 and 142, respectively.

The multi-link communication system 1 may adopt a block acknowledgment (BA) mechanism. The AP MLD 10 and the non-AP MLD 12 may establish a BA agreement for a multi-link operation (MLO) between the AP MLD 10 and the non-AP MLD 12. The BA agreement includes a BA window size of the BA window for the AP MLD 10 and the non-AP MLD 12 to maintain the BA window during the BA session. The BA window size may be 64, 128, 256, 1024 or other numbers of media access control (MAC) packets. Each MAC packet may have a sequence number (SN) and may be indexed according to the sequence number thereof. For example, the upper-layer software on the AP MLD 10 may divide a single file into 100 MAC packets, and attach sequence numbers from 1 to 100 respectively to the 100 MAC packets. If the BA window size is 64 MAC packets, in a downlink transmission, the AP MLD 10 may transmit 64 MAC packets having sequence numbers 1 to 64 to the non-AP MLD 12 via the link 141 and/or 142, and the non-AP MLD 12 may respond with a BA frame to confirm that the 64 packets are successfully received. Since there is no need for performing individual acknowledgments for individual MAC packets, and the MAC packets in the BA window may share a physical layer protocol header (PHY header), the implementation of the BA mechanism will reduce the overhead and increase the throughput of the multi-link communication system 1.

The embodiments of the invention are not limited to 2 APs, 2 STAs, and 2 links as shown in FIG. 1, those skilled in the art would recognize that other numbers of APs, STAs, and/or links may be adopted in the multi-link communication system 1 to satisfy the application requirements.

Figure 2:
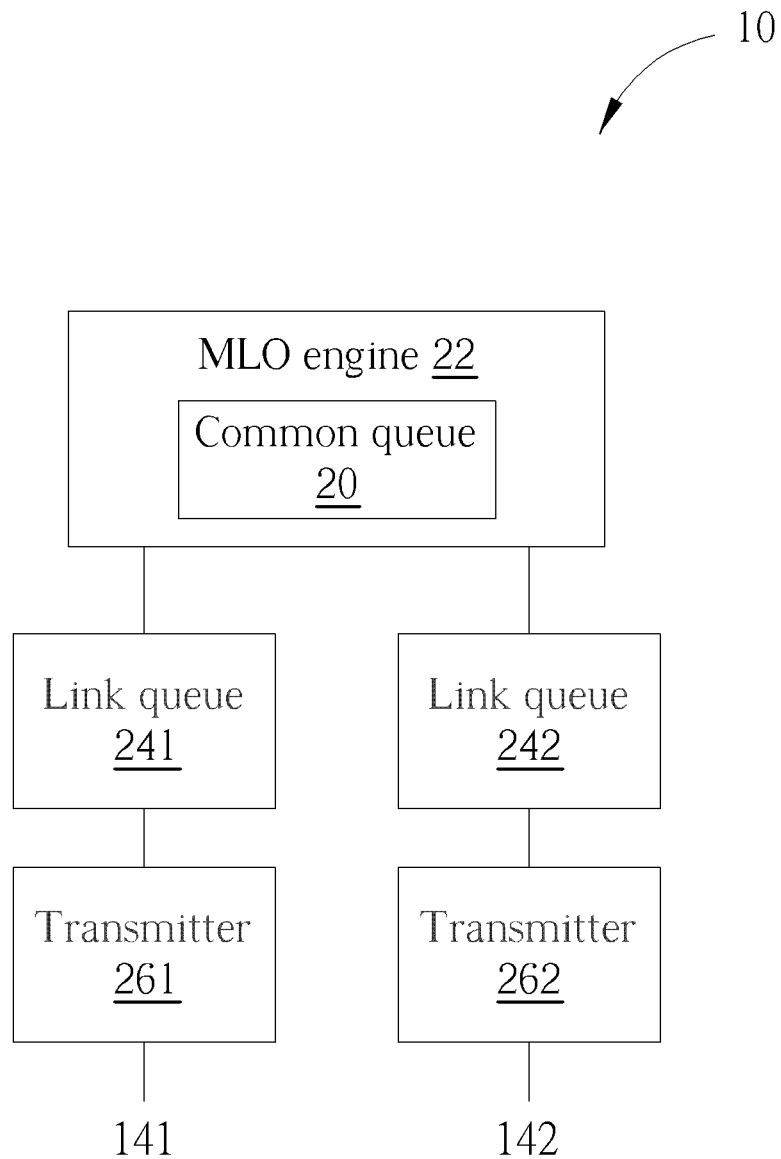
FIG. 2 is a block diagram of an access point multi-link device according to an embodiment of the invention.

FIG. 2 is a block diagram of an AP MLD 10 or a non-AP MLD 12 according to an embodiment of the present invention. Taking the AP MLD 10 as an example, the AP MLD 10 may include a link queue 241, a link queue 242, a multi-link operation (MLO) engine 22 (control circuit), a transmitter 261 and a transmitter 262. The MLO engine 22 may include a common queue 20. The MLO engine 22 is coupled to the link queue 241 and the link queue 242. The transmitter 261 is coupled to the link queue 241, and the transmitter 262 is coupled to the link queue 242.

The common queue 20 may obtain a plurality of MAC packets from upper-layer software or a host, and buffer the MAC packets. For example, the common queue 20 may buffer the 100 MAC packets having the sequence numbers from 1 to 100. The link queue 241 may buffer MAC packets to be transmitted via the link 141, and the link queue 242 may buffer MAC packets to be transmitted via the link 142. The sequence numbers of the MAC packets from the link queue 241 may be consecutive or non-consecutive, and the sequence numbers of the MAC packets from the link queue 242 may be consecutive or non-consecutive. Since the radio environment will vary over time, the connection qualities of the link 141 and the link 142 will vary with the radio environment. The MLO engine 22 may allocate the MAC packets from the common queue 20 to the link queue 241 and/or the link queue 242 according to the real-time radio environment. The transmitter 261 may transmit the MAC packets from the link queue 241 to the STA 121 via the link 141. The transmitter 262 may transmit the MAC packets from the link queue 242 to the STA 122 via the link 142. The embodiment in FIG. 2 is further applicable to the non-AP MLD 12. When serving as the non-AP MLD 12, the transmitter 261 may transmit the MAC packets from the link queue 241 to the AP 101 via the link 141. The transmitter 262 may transmit the MAC packets from the link queue 242 to the AP 102 via the link 142.

The MLO engine 22 may be implemented by hardware and firmware, and may quickly obtain system information and environmental parameters. If an allocation condition is not met, the MAC packets may temporarily reside in the common queue 20 and may not be allocated. If the allocation condition is met, the MLO engine 22 may allocate a set of MAC packets from the common queue 20 to the link queue 241 and/or the link queue 242 according to the system information and environmental parameters, significantly reducing the bandwidth and the delay of feedback transmissions, maintaining independence of the link 141 and the link 142 while conforming to the BA mechanism in the standard, and taking into account the real-time connection qualities of the link 141 and the link 142.

In some embodiments, the MLO engine 22 may set a first low threshold and a first high threshold for the link queue 241, and set a second low threshold and a second high threshold for the link queue 242. If the first quantity of all MAC packets in the link queue 241 is less than the first low threshold, the MLO engine 22 may increase an allocation priority of the link queue 241. When the first quantity exceeds the first high threshold, the MLO engine 22 may stop allocating MAC packets to the link queue 241. Similarly, if the second quantity of all MAC packets in the link queue 242 is less than the second low threshold, the MLO engine 22 may increase an allocation priority of the link queue 242. When the second quantity exceeds the second high threshold, the MLO engine 22 may stop allocating MAC packets to the link queue 242. For example, if the first low threshold is 5, the first high threshold is 32 and the first quantity is 4, and the second low threshold is 5, the second high threshold is 32 and the second quantity is 30, the MLO engine 22 may push up the allocation priority of the link queue 241 to be higher than that of the link queue 242, and allocate the MAC packets to the link queue 241 before to the link queue 242. By employing the low thresholds and the high thresholds, the MLO engine 22 may be prevented from allocating all MAC packets to a single link queue and performing downlink transmissions only to a single station without using the other stations for downlink transmissions for the most of the time.

In other embodiments, the MLO engine 22 may fill a set of MAC packets from the common queue 20 to the link queue 241 and/or the link queue 242 according to the system information and/or the environmental parameters. The system information may include a data status of the link queue 241, a data status of the link queue 242, a power saving status, the BA window size, and other information. In some embodiments, the MLO engine 22 may obtain the sequence number and the quantity of MAC packets in the link queue 241 and the sequence number and the quantity of MAC packets in the link queue 242 from the link queue 241 and the link queue 242, respectively. The MLO engine 22 may determine the minimum sequence number according to the sequence numbers of MAC packets in the link queue 241 and the link queue 242, and allocate a set of MAC packets from the common queue 20 to the link queue 241 and/or the link queue 242 according to the minimum sequence number while satisfying the BA mechanism, the method for allocating the set of MAC packets are outlined in FIG. 3, and will be detailed in the subsequent paragraphs. Provided that the BA mechanism is satisfied, the MLO engine 22 may determine a quantity of outgoing MAC packets from the link queue 241 according to the quantity of MAC packets in the link queue 241, and determine a quantity of outgoing MAC packets from the link queue 242 according to the quantity of MAC packets in the link queue 242, fill the MAC packets to the link queue 241 according to the quantity of outgoing MAC packets from link queue 241 until reaching the first high threshold, and fill the MAC packets to the link queue 242 according to the quantity of outgoing MAC packets from link queue 242 until reaching the second high threshold. For example, the first high threshold and the second high threshold are both 32, the quantity of outgoing MAC packets from link queue 241 is 10, and the quantity of outgoing MAC packets from link queue 242 is 0. In order to satisfy the BA mechanism, the MLO engine 22 may fill in 10 or more MAC packets to the link queue 241 until the link queue 241 contains 32 MAC packets, and then stop filling the MAC packets to the link queue 242. The environmental parameters may include a channel condition, a transmission speed, a transmission bandwidth, a rate of successful transmissions, and other parameters. In some embodiments, the MLO engine 22 may perform data collection on all connected stations, and the collected data may be analyzed by firmware to obtain the environmental parameters. For example, the first high threshold and the second high threshold are both 32, the channel condition of the link 141 is favorable, and the channel condition of the link 142 is unfavorable, in order to satisfy the BA mechanism, the MLO engine 22 may continue to fill the MAC packets to the link queue 241 until link queue 241 contains 32 MAC packets, while stop filling the MAC packets to the link queue 242.

In other embodiments, if the channel condition is unfavorable, the transmission speed is low, the transmission bandwidth is insufficient, the rate of successful transmissions is low, and/or the rate of transmission of outgoing MAC packets of the link queue is low, the MLO engine 22 may lower the low threshold of the corresponding link queue. If the channel condition is favorable, the transmission speed is high, the transmission bandwidth is sufficient, the rate of successful transmissions is high, and/or the rate of transmission of outgoing MAC packets of the link queue is high, the MLO engine 22 may raise the low threshold of the corresponding link queue. For example, if the channel condition of the link 141 is unfavorable, the transmission speed is low, the transmission bandwidth is insufficient, the rate of successful transmissions is low, and/or the rate of transmission of outgoing MAC packets of the link queue 241 is low, the MLO engine 22 may lower the first low threshold of the link queue 241 from 5 to 4, thereby reducing the allocation priority of link queue 241. Conversely, if the channel condition of the link 141 is favorable, the transmission speed is high, the transmission bandwidth is sufficient, the rate of successful transmissions is high, and/or the rate of transmission of outgoing MAC packets of the link queue 241 is high, the MLO engine 22 may raise the first low threshold from 5 to 6, thereby increasing the allocation priority of the link queue 241.

In other embodiments, the MLO engine 22 may adjust an allocation ratio N:M according to the system information and the environmental parameters, and allocate the set of MAC packets to the link queue 241 and/or the link queue 242 using the allocation ratio N:M, N and M being the equal or different positive integers, for example, N and M may be 1 and 1. For example, if the BA window size is 64 MAC packets and N:M is 1:1, during a downlink transmission, the MLO engine 22 may allocate the MAC packets with sequence numbers 1 to 64 from the common queue 20. In some embodiments, the MLO engine 22 may allocate MAC packets with allocation numbers 1 to 32 to the link queue 241 and allocate MAC packets with allocation numbers 33 to 64 to the link queue 242.

In some embodiments, the MLO engine 22 may allocate the MAC packets according to the power saving state of AP MLD 10. For example, if a power saving state of the AP MLD 10 indicates that the link 141 is about to stop transmitting MAC packets to the STA 121, the MLO engine 22 may allocate the set of MAC packets to the link queue 242.

In other embodiments, if the channel condition is unfavorable, the transmission speed is low, the transmission bandwidth is insufficient, the rate of successful transmissions is low, and/or the rate of transmission of outgoing MAC packets of the link queue is low, the MLO engine 22 may reduce an allocation ratio of the corresponding link queue. If the channel condition is favorable, the transmission speed is high, the transmission bandwidth is sufficient, the rate of successful transmissions is high, and/or the rate of transmission of outgoing MAC packets of the link queue is high, the MLO engine 22 may raise the allocation ratio of the corresponding link queue. For example, if the channel condition of the link 141 is unfavorable, the transmission speed is low, the transmission bandwidth is insufficient, the rate of successful transmissions is low, and/or the rate of transmission of outgoing MAC packets of the link queue 241 is low, the MLO engine 22 may lower the allocation ratio of the link queue 241. Conversely, if the channel condition of the link 141 is favorable, the transmission speed is high, the transmission bandwidth is sufficient, the rate of successful transmissions is high, and/or the rate of transmission of outgoing MAC packets of the link queue 241 is high, the MLO engine 22 may raise the allocation ratio of the link queue 241.

In other embodiments, after the quantity of the MAC packets in the link queue 241 is higher than the first low threshold and the quantity of the MAC packets in the link queue 242 is higher than the second low threshold, the MLO engine 22 may use a time multiplexing mode (traffic light mode), a dynamic allocation mode (traffic control mode) or a special mode (emergency mode) for packet allocation.

In the time multiplexing mode, the MLO engine 22 may allocate a plurality of sets of MAC packets from the common queue 20 to the link queue 241 and/or the link queue 242 in turn, and these sets of MAC packets correspond to a plurality of non-AP MLDs. In some embodiments, the AP MLD 10 may establish links with a first non-AP MLD, a second non-AP MLD, and a third non-AP MLD. The MLO engine 22 may allocate channel resources to each non-AP MLD for downlink transmissions using packet allocation. For example, the MLO engine 22 may allocate a corresponding set of MAC packets of a first non-AP MLD to the link queue 241 and/or link queue 242 for the first non-AP MLD to receive the MAC packets from the link queue 241 and/or the link queue 242 for 1 second, the MLO engine 22 may allocate a corresponding set of MAC packets of a second non-AP MLD to the link queue 241 and/or link queue 242 for the second non-AP MLD to receive the MAC packets from the link queue 241 and/or the link queue 242 for 1 second, and then the MLO engine 22 may allocate a corresponding set of MAC packets of a third non-AP MLD to the link queue 241 and/or link queue 242 for the third non-AP MLD to receive the MAC packets from the link queue 241 and/or the link queue 242 for 1 second. The loop may continue for the first non-AP MLD, the second non-AP MLD and the third non-AP MLD to receive the MAC packets from the link queue 241 and/or the link queue 242 in turn. The time multiplexing mode may prevent certain non-AP MLDs from grabbing too many channel resources, and prevent the other non-AP MLDs from using the channel resources and entering a starvation state. In other words, the first non-AP MLD, the second non-AP MLD and the third non-AP MLD may share the link 141 and the link 142 in a manner of time-division multiplexing. In some embodiments, the time multiplexing mode may be applied to the AP MLD 10.

In the dynamic allocation mode, the MLO engine 22 may allocate the MAC packets to the link queue 241 and/or the link queue 242 according to the quantity of outgoing MAC packets therefrom. In some embodiments, the MLO engine 22 may obtain a first quantity of all MAC packets in the link queue 241 and a second quantity of all MAC packets in the link queue 242, and determine a first quantity of outgoing MAC packets from the link queue 241 according to the first quantity, determine a second quantity of outgoing MAC packets from the link queue 242 according to the second quantity, and allocate a plurality of MAC packets of the set of MAC packets according to the first quantity of outgoing MAC packets and the second quantity of outgoing MAC packets. In some embodiments, the MLO engine 22 may fill a quantity of MAC packets equal to the first quantity of outgoing MAC packets to the link queue 241, and fill a quantity of MAC packets equal to the second quantity of outgoing MAC packets to the link queue 242. If the link quality is favorable, the quantity of outgoing MAC packets from the corresponding link queue will be larger, and the quantity of filling MAC packets will be increased accordingly, increasing the throughput of the link. In some embodiments, the dynamic allocation mode may be applied to the non-AP MLD 12.

In the special mode, the MLO engine 22 may allocate a MAC packet having the highest priority to the link queue 241 or the link queue 242 upon meeting a special condition, so as to deal with a special condition or an emergency condition. In some embodiments, if one of the MAC packets in the set of MAC packets is a time-sensitive MAC packet of the STA 121, the MLO engine 22 may allocate the MAC packet to the link queue 241. If the MAC packet is a time-sensitive MAC packet of the STA 122 MAC packet, the MLO engine 22 may allocate the MAC packet to the link queue 242. The time-sensitive MAC packet may be connection confirmation packets sent periodically, an audio packet, a video packet, a packet of a station about to enter a starvation state, or packets of other time-sensitive data. In some embodiments, the special allocation mode may be applied to the AP MLD 10 and the non-AP MLD 12.

Figure 3:
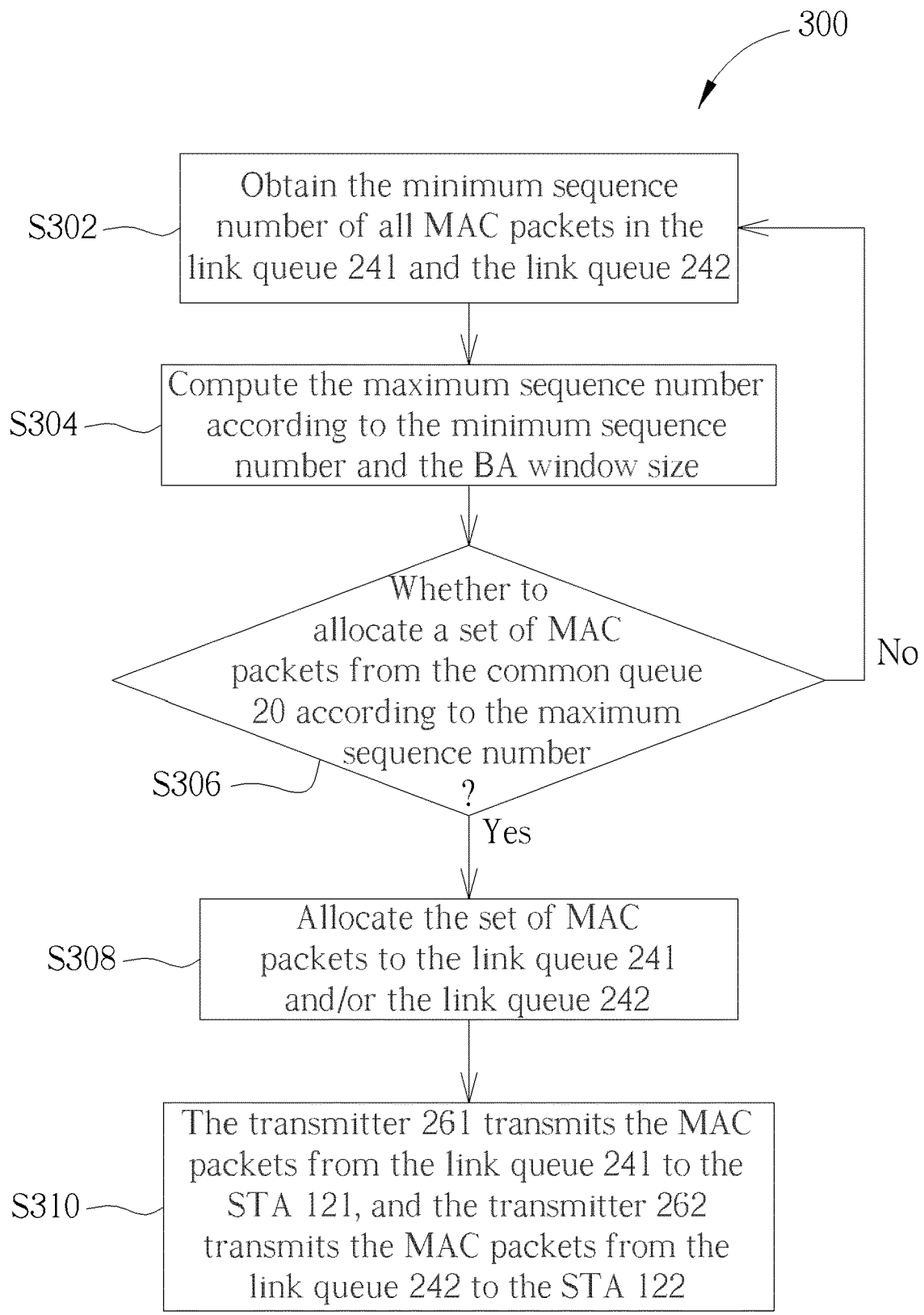
FIG. 3 is a flowchart of a packet allocation method of the access point multi-link device in FIG. 2.

FIG. 3 is a flowchart of a packet allocation method 300 of the AP MLD 10. The packet allocation method 300 includes Steps S302 to S310 for allocating MAC packets during the MLO operation. Any reasonable step change or adjustment is within the scope of the disclosure. Steps S302 to S310 are detailed as follows:

Step S302: Obtain the minimum sequence number of all MAC packets in the link queue 241 and the link queue 242;

Step S304: Compute the maximum sequence number according to the minimum sequence number and the BA window size;

Step S306: Determine whether to allocate a set of MAC packets from the common queue 20 according to the maximum sequence number? if so, proceed to Step S308; and if not, go to Step S302;

Step S308: Allocate the set of MAC packets to the link queue 241 and/or the link queue 242;

Step S310: The transmitter 261 transmits the MAC packets from the link queue 241 to the STA 121, and the transmitter 262 transmits the MAC packets from the link queue 242 to the STA 122.

In Step S302, the MLO engine 22 obtains the sequence numbers of all the MAC packets from the link queue 241 from the link queue 241 and obtains the sequence numbers of all the MAC packets from the link queue 242 from the link queue 242, so as to determine the minimum sequence number. For example, if the MAC packets with the sequence numbers 1 to 32 have not been successfully transmitted and are still buffered in the link queue 241, and the MAC packets with the sequence numbers 33 to 64 in the link queue 242 have all been transmitted, the MLO engine 22 may determine that the minimum sequence number is 1. In Step S304, the MLO engine 22 computes the maximum sequence number according to the minimum sequence number to satisfy the BA window size. For example, if the BA window size is 64 MAC packets and the minimum sequence number is 1, the MLO engine 22 may compute the maximum sequence number as 64. In Step S306, the MLO engine 22 determines whether to allocate a set of MAC packets from the common queue 20 according to the maximum sequence number, so as to satisfy the requirement of the BA mechanism. For example, if the maximum sequence number is 64, since the common queue 20 only contains MAC packets with sequence numbers 65 to 100, which do not meet the allocation condition, the MLO engine 22 may allow the MAC packets to temporarily reside in the common queue 20 without being allocated. In another example, if all the MAC packets with the sequence numbers 1 to 32 in the link queue 241 have been transmitted, and the MAC packets with the sequence numbers 33 to 64 have not been successfully transmitted and are still buffered in the link queue 242, the minimum sequence number becomes 33 (Step S302); the MLO engine 22 may compute the maximum sequence number as 96 (Step S304); since the common queue 20 contains MAC packets with the sequence numbers 65 to 96, the allocation condition is met, and the MLO engine 22 may allocate a set of MAC packets from the common queue 20 including the MAC packets with the sequence numbers 65 to 96 (Step S306).

In Step S308, the MLO engine 22 allocates the set of MAC packets to the link queue 241 or the link queue 242 using the low thresholds, the high thresholds, and three packet allocation modes according to the system information and the environmental parameters. The details can be found in the preceding paragraphs and will not be repeated here for brevity. In Step S310, the transmitter 261 and the transmitter 262 transmit the MAC packets from the link queue 241 and the link queue 242 to the STA 121 (the first receiving device) and the STA 122 (the second receiving device), respectively.

The embodiment of FIG. 3 is also applicable to the non-AP MLD 12. When the non-AP MLD 12 is the non-AP MLD 12, the transmitter 261 transmits the MAC packet from the link queue 241 to the AP 101 via the link 141 in Step S310. The transmitter 262 transmits the MAC packets from the link queue 242 to the AP 102 via the link 142.

The embodiments in FIGS. 2 and 3 disclose a multi-link device and a packet allocation method for allocating packets in an MLO operation according to the system information and the environmental parameters, significantly reducing the delay and bandwidth usage in feedback transmission, maintaining the independence of individual links while conforming to the BA mechanism in the standard, taking into account the real-time link quality of individual links, preventing excessive channel resource from being used by few stations, increasing the throughputs of links, and providing special packet allocation in the special conditions.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A multi-link device comprising:
a first link queue;
a second link queue;
a control circuit coupled to the first link queue and the second link queue, comprising a common queue configured to buffer a plurality of packets, each packet having a sequence number, and the control circuit being configured to obtain a minimum sequence number of all packets in the first link queue and all packets in the second link queue, compute a maximum sequence number according to the minimum sequence number and a block acknowledgment window size, determine whether to allocate a set of packets from the common queue according to the maximum sequence number, and if so, allocate the set of packets to the first link queue and/or the second link queue;
a first transmitter coupled to the first link queue, and configured to transmit a packet from the first link queue to a first receiving device; and
a second transmitter coupled to the second link queue and configured to transmit a packet from the second link queue to a second receiving device.

2. The multi-link device of claim 1, wherein the control circuit is further configured to obtain a first quantity of all packets in the first link queue and a second quantity of all packets in the second link queue, when the first quantity is less than a first low threshold, increase an allocation priority to the first link queue, and when the second quantity is less than a second low threshold, increase an allocation priority to the second link queue.

3. The multi-link device of claim 2, wherein the control circuit is further configured to determine a first quantity of outgoing packets from the first link queue according to the second quantity, determine a second quantity of outgoing packets from the second link queue according to the second quantity, adjust the first low threshold according to the first quantity of outgoing packets, and adjust the second low threshold according to the second quantity of outgoing packets.

4. The multi-link device of claim 1, wherein the control circuit is further configured to obtain a first quantity of all packets in the first link queue and a second quantity of all packets in the second link queue, when the first quantity exceeds a first high threshold, stop allocating packets to the first link queue, and when the second quantity exceeds a second high threshold, stop allocating packets to the second link queue.

5. The multi-link device of claim 1, wherein the control circuit is configured to alternately allocate the set of packets of a first multi-link device and another set of packets of a second multi-link device from the common queue to the first link queue and/or the second link queue.

6. The multi-link device of claim 1, wherein the control circuit is further configured to obtain a first quantity of all packets in the first link queue and a second quantity of all packets in the second link queue, determine a first quantity of outgoing packets from the first link queue according to the second quantity, determine a second quantity of outgoing packets from the second link queue according to the second quantity, and allocate a plurality of packets of the set of packets according to the first quantity of outgoing packets and the second quantity of outgoing packets.

7. The multi-link device of claim 1, wherein if one packet of the set of packets is a time-sensitive packet of the first receiving device, the control circuit is configured to allocate the packet to the first link queue, and if the packet is a time-sensitive packet of the second receiving device, the control circuit is configured to allocate the packet to the second link queue.

8. The multi-link device of claim 1, wherein if a transmission to the first receiving device is about to stop, the control circuit is configured to allocate the set of packets to the second link queue.

9. A packet allocation method for a multi-link device comprising a first link queue, a second link queue, a control circuit, a first transmitter and a second transmitter, the control circuit being coupled to the first link queue and the second link queue, and the control circuit comprising a common queue configured to buffer a plurality of packets, each packet having a sequence number, the first transmitter being coupled to the first link queue, the second transmitter being coupled to the second link queue, and the packet allocation method comprising:
the control circuit obtaining a minimum sequence number of all packets in the first link queue and all packets in the second link queue;
the control circuit computing a maximum sequence number according to the minimum sequence number and a block acknowledgement window size;
the control circuit determining whether to allocate a set of packets from the common queue according to the maximum sequence number;
if the control circuit determines to allocate the set of packets, the control circuit allocating the set of packets to the first link queue and/or the second link queue;
the first transmitter transmitting a packet in the first link queue to a first receiving device; and
the second transmitter transmitting a packet in the second link queue to a second receiving device.

10. The method of claim 9, further comprising:
the control circuit obtaining a first quantity of all packets in the first link queue and a second quantity of all packets in the second link queue; and
when the first quantity is less than a first low threshold, the control circuit increasing an allocation priority to the first link queue, and when the second quantity is less than a second low threshold, the control circuit increasing an allocation priority to the second link queue.

11. The method of claim 10, further comprising:
the control circuit determining a first quantity of outgoing packets from the first link queue according to the first quantity, and determining a second quantity of outgoing packets from the second link queue according to the second quantity; and
the control circuit adjusting the first low threshold according to the first quantity of outgoing packets, and adjusting the second low threshold according to the second quantity of outgoing packets.

12. The method of claim 9, further comprising:
the control circuit obtaining a first quantity of all packets in the first link queue and a second quantity of all packets in the second link queue; and
when the first quantity exceeds a first high threshold, stopping from allocating packets to the first link queue, and when the second quantity exceeds a second high threshold, stopping from allocating packets to the second link queue.

13. The method of claim 9, wherein if it the control circuit determines to allocate the set of packets, the control circuit allocating the set of packets to the first link queue and/or the second link queue comprising:

the control circuit alternately allocating the set of packets of a first multi-link device and another set of packets of a second multi-link device from the common queue to the first link queue and/or the second link queue.

14. The method of claim 9, wherein if it the control circuit determines to allocate the set of packets, the control circuit allocating the set of packets to the first link queue and/or the second link queue comprising:

the control circuit obtaining a first quantity of all packets in the first link queue and a second quantity of all packets in the second link queue;

the control circuit determining a first quantity of outgoing packets from the first link queue according to the first quantity, and determining a second quantity of outgoing packets from the second link queue according to the second quantity; and the control circuit allocating a plurality of packets of the set of packets according to the first quantity of outgoing packets and the second quantity of outgoing packets.

15. The method of claim 9, wherein if it the control circuit determines to allocate the set of packets, the control circuit allocating the set of packets to the first link queue and/or the second link queue comprising:

if one packet of the set of packets is a time-sensitive packet of the first receiving device, the control circuit allocating the packet to the first link queue; and if the packet is a time-sensitive packet of the second receiving device, the control circuit allocating the packet to the second link queue.

16. The method of claim 9, wherein if the control circuit determines to allocate the set of packets, the control circuit allocating the set of packets to the first link queue and/or the second link queue comprising:

if a transmission to the first receiving device is about to stop, the control circuit allocating the set of packets to the second link queue.

* * * * *